US010106124B1

(12) United States Patent
Larner et al.

(10) Patent No.: US 10,106,124 B1
(45) Date of Patent: Oct. 23, 2018

(54) STICKY AIRBAG FOR PEDESTRIAN PROTECTION

(71) Applicant: Waymo LLC, Mountain View, CA (US)

(72) Inventors: Daniel Lynn Larner, San Jose, CA (US); Courtney McCool, San Jose, CA (US); Peter Craig Lombrozo, Santa Cruz, CA (US)

(73) Assignee: Waymo LLC, Mountain View, CA (US)

( * ) Notice: Subject to any disclaimer, the term of this patent is extended or adjusted under 35 U.S.C. 154(b) by 60 days.

(21) Appl. No.: 15/247,343

(22) Filed: Aug. 25, 2016

(51) Int. Cl.
*B60R 21/36* (2011.01)
*B60R 21/0134* (2006.01)

(52) U.S. Cl.
CPC .......... *B60R 21/36* (2013.01); *B60R 21/0134* (2013.01)

(58) Field of Classification Search
CPC ................................ B60R 21/36; B60R 21/34
See application file for complete search history.

(56) References Cited

U.S. PATENT DOCUMENTS

| 5,755,459 | A | 5/1998 | LaLonde | |
|---|---|---|---|---|
| 7,172,048 | B2* | 2/2007 | Hamada | B60R 21/2338 180/271 |
| 9,340,178 | B1 | 5/2016 | Khaykin et al. | |
| 9,511,741 | B1* | 12/2016 | Wu | B60R 21/36 |
| 2003/0102177 | A1* | 6/2003 | Igawa | B60R 21/36 180/271 |
| 2015/0107928 | A1* | 4/2015 | Mazanek | B60R 21/36 180/274 |
| 2016/0200287 | A1* | 7/2016 | Mazanek | B60R 21/237 180/274 |

FOREIGN PATENT DOCUMENTS

| JP | 08183423 A | * | 7/1996 | ............. B60R 21/36 |
|---|---|---|---|---|
| JP | 2008254498 A | * | 10/2008 | |

OTHER PUBLICATIONS

Uzuki et al., Hood Airbag Device, Jul. 16, 1996, JPO, JP 08-183423 A, English Abstract (Year: 1996).*
Uzuki et al., Hood Airbag Device, Jul. 16, 1996, JPO, JP 08-183423 A, Machine Translation of Description (Year: 1996).*
Iwamoto et al., Hood Airbag Device for Pedestrian Protection, Oct. 23, 2008, JPO, JP 2008-254498 A, Machine Translation of Description (Year: 2008).*
Iwamoto et al., Hood Airbag Device for Pedestrian Protection, Oct. 23, 2008, JPO, JP 2008-254498 A, English Abstract (Year: 2008).*

* cited by examiner

*Primary Examiner* — James A English
(74) *Attorney, Agent, or Firm* — Lerner, David, Littenberg, Krumholz & Mentlik, LLP

(57) ABSTRACT

Aspects of the disclosure relate to airbag systems for vehicles. The airbag systems may reduce the secondary impact forces felt by an object upon rebounding from an initial impact with an external airbag by encasing or substantially surrounding the pedestrian with the external airbag. The airbag system may include an external airbag configured to deploy in a vehicle's external environment in order to reduce the likelihood of an object colliding directly with the vehicle and at least one adhesive layer arranged on the external airbag, wherein the adhesive layer is configured to reduce injury caused by a secondary impact of an object upon after an initial impact of the object with the external airbag by causing the object to stick to the external airbag.

18 Claims, 13 Drawing Sheets

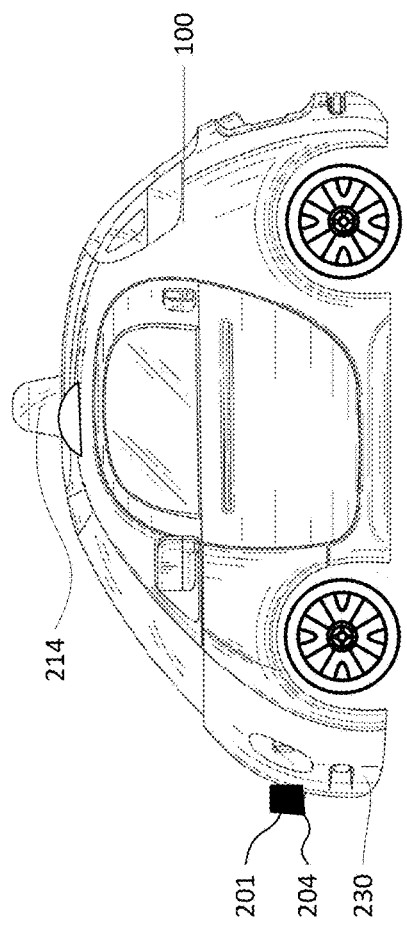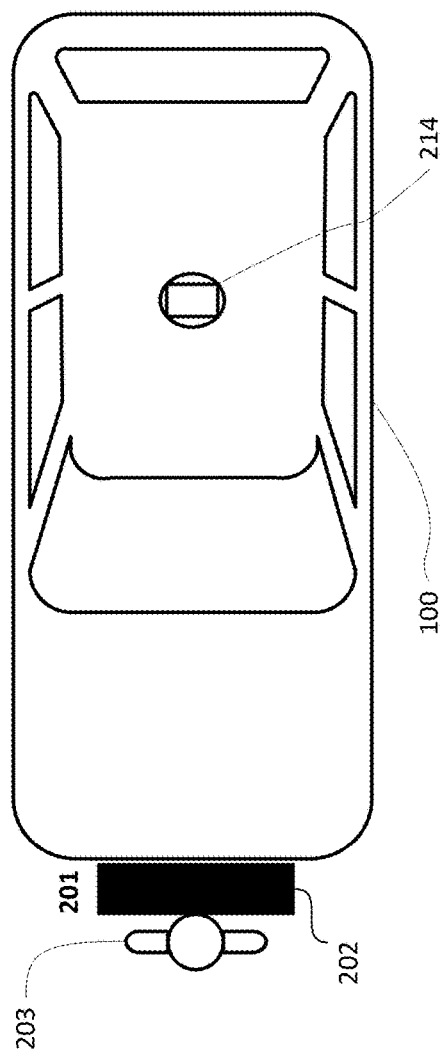

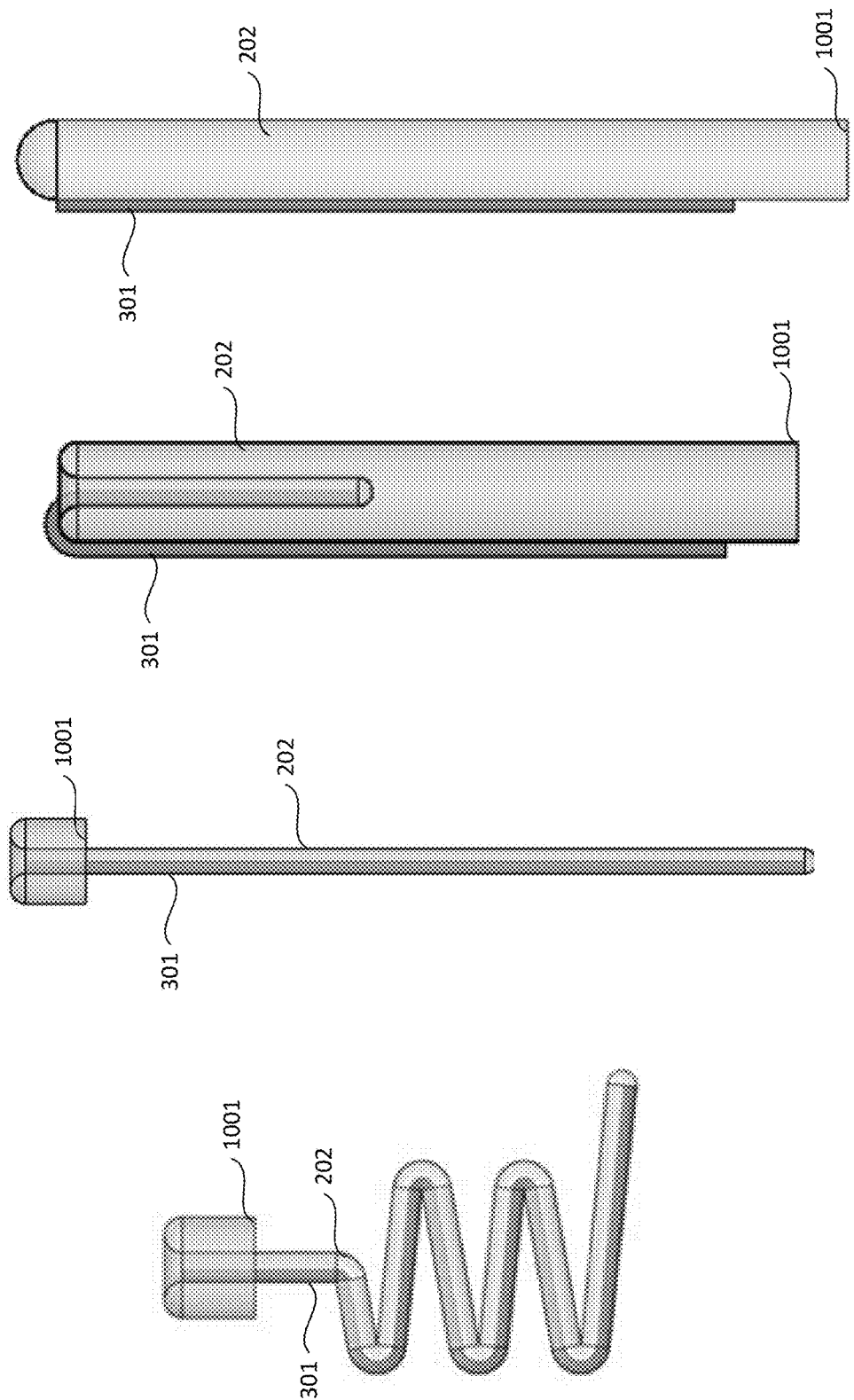

STICKY AIRBAG FOR PEDESTRIAN PROTECTION

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pick up or destination location, and the vehicle maneuvers itself to that location.

An important component of an autonomous vehicle is the perception system, which allows the vehicle to perceive and interpret its surroundings using cameras, radar, sensors, and other similar devices. Data from the perception system is then used by the autonomous vehicle's computer to make numerous decisions while the autonomous vehicle is in motion, such as deciding when to speed up, slow down, stop, turn, etc. These decisions are used to maneuver between locations but also to interact with and avoid collisions with other objects along the way.

When a collision actually occurs, non-autonomous and autonomous vehicles alike may include various safety mechanisms to reduce injury to passengers. Typically, the safety mechanisms may include airbag systems employed to protect passengers from impacts with the interior of a vehicle after an object external to a vehicle has impacted a bumper or other portion of the vehicle.

BRIEF SUMMARY

Embodiments within the disclosure relate generally to a system including an external airbag configured to deploy in a vehicle's external environment in order to reduce the likelihood of an object colliding directly with the vehicle. At least one adhesive layer may be arranged on the external airbag, wherein the adhesive layer may be configured to reduce injury caused by a secondary impact of an object after an initial impact of the object with the external airbag by causing the object to stick to the external airbag.

In some embodiments the external airbag may comprise a front portion where an impact with the object is expected to occur and an opposite back portion, and wherein the adhesive layer may be applied to the front portion.

In some embodiments a second adhesive layer may be applied to the opposite back portion, wherein the second adhesive layer may be configured to bond the external airbag to the vehicle.

In some embodiments the adhesive may be applied in a patterned arrangement.

In some embodiments the object may be a pedestrian and the adhesive may be applied on a lower portion corresponding to an expected location of the legs of the object prior to impact.

In some embodiments the adhesive may be covered by a removable release layer prior to deployment.

In some embodiments the removable release layer may be configured to be removed from the adhesive upon deployment of the external airbag.

In some embodiments the removable release layer may be attached to the vehicle, and configured to be removed from the adhesive by the vehicle pulling the release layer upon deployment of the external airbag.

In some embodiments the adhesive comprises a fast-tack glue.

In some embodiments the external airbag may be attached to the vehicle with a fastener and the fastener may release the external airbag from the vehicle after the initial impact.

In some embodiments the system may include an expansion device, wherein the expansion device may be configured to deploy the external airbag with an expansion force greater than the force of the adhesive.

In some embodiments at least one non-stick layer may be arranged on the external airbag at locations where the at least one adhesive layer is not present.

In some embodiments the external airbag is stored in a compartment attached to the vehicle.

In some embodiments the external airbag may be rolled upon itself while stored in the compartment.

In some embodiments the external airbag may be everted while stored in the compartment.

In some embodiments the external airbag may be accordion folded.

In some embodiments the external airbag may be configured to be deployed by inflation, wherein the inflation causes the external airbag to expand.

In some embodiments the system may include a vehicle and an external airbag system, wherein the external airbag system may comprise the external airbag and the external airbag system may be attached to the vehicle.

Another aspect includes a method for deploying a vehicle's external airbag configured to deploy in a vehicle's external environment in order to reduce the likelihood of an object colliding directly with the vehicle. One or more processors may determine a collision with the object is imminent, and predict the location on the vehicle where the collision with the object is expected to occur. The one or more processors may determine a first external airbag of one or more external airbags at the location on the vehicle where the collision is expected to occur and send a triggering signal to deploy the first external airbag. In response to receiving the triggering signal, the one or more processors may send a deployment signal to the first external airbag, wherein the first external airbag may comprise at least one adhesive layer arranged on the first external airbag, wherein the adhesive layer may be configured to reduce injury caused by a secondary impact of an object after an initial impact of the object with the external airbag by causing the object to stick to the external airbag.

BRIEF DESCRIPTION OF THE DRAWINGS

FIGS. 2A and 2B are example external views of a vehicle in accordance with aspects of the disclosure.

FIGS. 10A-10D are example illustrations of the deployment of an everted external airbag in accordance with aspects of the disclosure.

DETAILED DESCRIPTION

Overview

Figure 1:
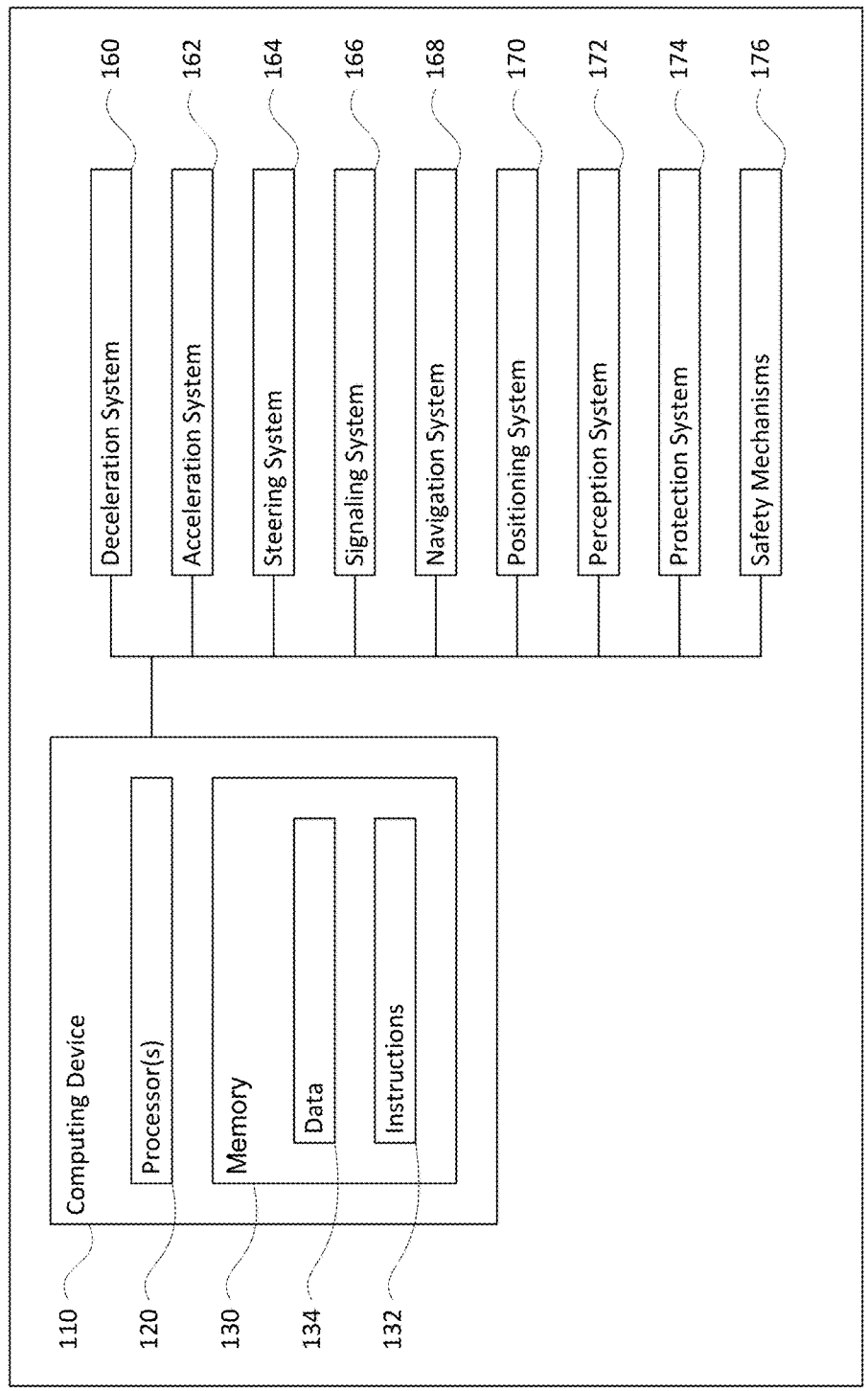
FIG. 1 is a functional diagram of an example vehicle in accordance with aspects of the disclosure.

This technology relates to external airbags which reduce the potential of secondary impact injuries to pedestrians or other objects impacted by a vehicle. For example, computing devices within a vehicle may determine that an impact with an object, such as a pedestrian, cannot be avoided by way of braking, steering, and/or accelerating the vehicle. When this is the case, the computing devices may release an external airbag to absorb the initial impact of the pedestrian and stop the pedestrian from making direct contact with the vehicle. However, after the initial impact, the pedestrian may be rebounded from (or bounce off of) the external airbag in an opposite direction. As such, the pedestrian is susceptible to secondary impact injuries, as the pedestrian may hit the ground or another object after being rebounded. To minimize or even eliminate the secondary impact injuries, the external airbag may be coated in an adhesive to absorb some of the initial and secondary impact forces by slowing or preventing the release of the pedestrian from the external airbag upon the pedestrian rebounding from the initial impact.

External airbags may be mounted to a vehicle internally or externally. In this regard, the external airbag may be stored in a compartment, which may be mounted anywhere on or within the vehicle.

The external airbags may be designed to deploy and expand upon the vehicle detecting an imminent impact. In this regard, the vehicle's computing device may determine that an impact with a pedestrian is imminent and send a signal to deploy the external airbag. In response to the signal, the external airbag may then be inflated or filled to an expanded state.

In some embodiments a layer of an adhesive may be applied to the external airbag. This adhesive may help to absorb some of the secondary impact forces by slowing or preventing the release of the pedestrian from the external airbag upon the pedestrian rebounding from the initial impact. The adhesive layer may be applied in a pattern to avoid the external airbag sticking to itself during deployment. In other embodiments, larger portions of or an entire impact area of the external airbag may be coated by the adhesive. In some embodiments the adhesive may be covered by a release layer which may be removed as the external airbag expands.

Particular areas of the external airbag may be covered in the adhesive to target certain portions of a pedestrian's body. In one example, the lower portion of the airbag may be covered with adhesive to cause the airbag to stick to the pedestrian's legs.

The external airbag may enclose the pedestrian and be detachable from the vehicle. In this regard, the airbag may be designed to entirely surround the pedestrian and release from the vehicle when the pedestrian rebounds from the initial impact.

The external airbag may be attached to the vehicle with a temporary adhesive or connector. For instance, upon a pedestrian rebounding from the initial impact, the hook and loop fastener may release the airbag causing the airbag, and the pedestrian therein, to move freely from the vehicle.

The features described above may allow for improved safety around a vehicle. In this regard, the vehicle may offer safety measures to individuals and objects outside of the vehicle. Accordingly, vehicles can operate in environments close to pedestrians and other external objects with a reduced chance of causing injury or damage to the pedestrians or objects in the case of an inadvertent collision.

In addition, as discussed in detail below, the features described herein allow for various alternatives.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 154 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, and perception system 172, and protection system 174 in order to control the movement, speed, etc. of vehicle 100 in accordance with the instructions 134 of memory 130. Again, although these systems are shown as external to computing device 110, in actuality, these systems may also be incorporated into computing device 110, again as an autonomous driving computing system for controlling vehicle 100. As with the computing device 110, each of these systems may also include one or more processors as well as memory storing data and instructions as with processors 120, memory 130, data 132 and instructions 134.

As an example, computing device 110 may interact with deceleration system 160 and acceleration system 162 in order to control the speed of the vehicle. Similarly, steering system 164 may be used by computer 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the perception system 170 may include lasers, sonar, radar, cameras and/or any other detection devices that record data which may be processed by computing device 110. In the case where the vehicle is a small passenger vehicle such as a car, the car may include a laser sensor 214 (shown in FIGS. 2A and 2B) or other sensors mounted on the roof or other convenient location.

The computing device 110 may control the direction and speed of the vehicle by controlling various components. By way of example, computing device 110 may navigate the vehicle to a destination location completely autonomously using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 162 may be a part of a drivetrain that includes various components between an engine of the vehicle and the wheels of the vehicle. Again, by controlling these systems, computing device 110 may also control the drivetrain of the vehicle in order to maneuver the vehicle autonomously.

The sensors of perception system 172 may detect objects in the vehicle's environment as well as characteristics of those objects such as their location, heading, size (length height and width), type, and approximate center of gravity. For example, the perception system may use the height of an object identified as a pedestrian (or human) to estimate the approximate center of gravity of the object. In this regard, the perception system may compare the characteristics of the object to known anthropomorphic data to determine an approximate center of gravity. For other object types, the approximate center of gravity may be determined from the characteristics of the object using various known statistical analyses. Data and information required for these determinations may be stored, for example, in memory 130 or a different memory of the perception system.

As discussed in more detail below, information from the perception system may be sent to various other systems in order to make decisions about when and how to deploy various safety mechanisms. In this regard, the perception system may send the information to the vehicle's computing devices which make such decisions and forward activation instructions to protection system 174 which deploys one or more safety mechanisms 176 in accordance with the activation instructions. In another example, the perception system 172 may forward the information directly to the protection system 174 which may make a determination whether and how to deploy one or more safety mechanisms 176.

Thus, the vehicle may also include a plurality of safety mechanisms 176. These safety mechanisms may be configured to reduce the likelihood of damage to objects outside of the vehicle as opposed to those meant to specifically protect passengers inside the vehicle. At least some of these safety mechanisms may be active, in that the device must be activated or deployed by a signal generated by one or more computing devices when an impact is imminent.

The one or more safety mechanisms 176 may include one or more airbag systems, including an active external airbag system having at least one external airbag. Prior to deployment, an external airbag may be mounted to a vehicle internally or externally. For example, prior to deployment, an airbag system 201 may be stored in a compartment within the vehicle. For example, as shown in FIG. 2A, the airbag system 201 may be stored in compartment 204 of the vehicle's front bumper 230. In some embodiments, such compartment 204 may be mounted anywhere on or within the vehicle. For instance, compartments housing one or more external airbags may be mounted within the front bumper 230, rear bumper or trunk of the vehicle, within the vehicles doors, or attached to the exterior of the vehicle. In this regard, the external airbag systems may include multiple external airbags.

An external airbag of the one or more airbag system may be designed to deploy and expand upon the vehicle detecting an imminent impact. For instance, using information received from the vehicle's perception system 172, the computing device 110, may determine that an impact with an object, such as a pedestrian, is imminent. In response, the computing device may provide this information to the protection system 174 which selects or identifies the external airbag for deployment according to the circumstances of the imminent impact as provided in the computing devices. Thus, where appropriate, the protection system 174 may send a signal to the safety mechanisms 176 (including the external airbag 202) in order to deploy the external airbag 202. Upon receiving the signal to deploy, the external airbag 202 may be inflated or filled to an expanded state, as shown in FIG. 2B.

As with a typical airbag, the external airbag may be configured to absorb the initial impact forces. In this regard, external airbag 202 may be comprised of nylon, polyester, and/or other such materials typically used to make airbags. In addition, the external airbag 202 may be configured to cover or block a portion of the vehicle 100 with which the pedestrian 203 is projected to impact. For example, as further shown in FIG. 2B, when an impact between the vehicle 100 and the pedestrian 203 is determined to be imminent, the external airbag 202 may be configured such that it deploys in a vertical orientation extending from around ground level, upward. This may allow the external airbag to block the pedestrian 203 from making contact with the portion of the vehicle 100 with which the pedestrian is projected to impact. Thus, the external airbag 202 may be configured such that it acts as a barrier blocking the pedestrian 203 from hitting the windshield and/or hood of the vehicle, as shown in FIG. 2B. Alternatively, when an impact with the pedestrian 203 is projected to occur at a different portion of the vehicle 100, such as the rear of the vehicle, a different external airbag of the external airbag system may be deployed in order to cover that portion of the vehicle (e.g., the rear windshield and/or tailgate or trunk of the vehicle).

Figure 3:
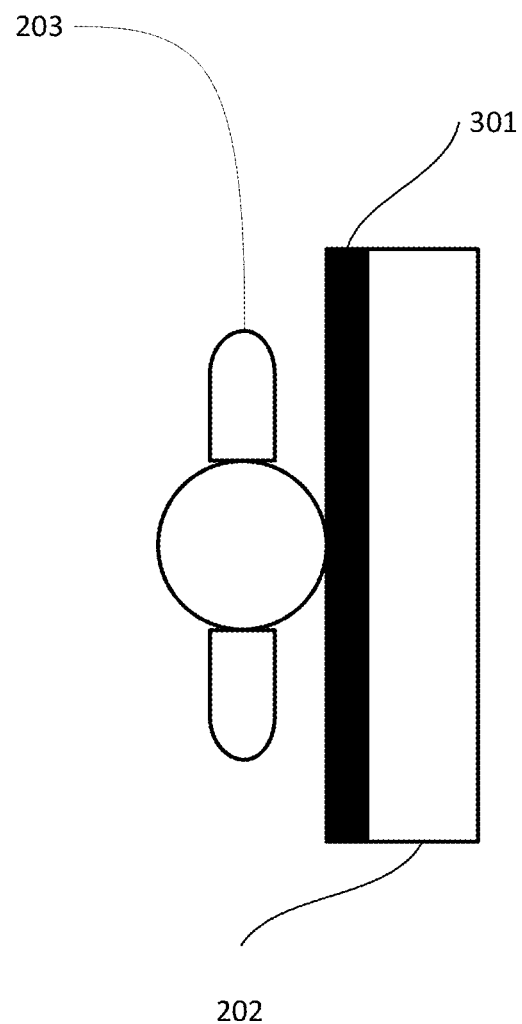
FIG. 3 is an example view of an external airbag coated with an adhesive in accordance with aspects of the disclosure.

A layer of an adhesive may be applied to the external airbag to absorb some of the initial and secondary impact forces. In this regard, the adhesive may prevent the pedestrian from sliding across the external airbag during the initial impact into the vehicle or another object. The adhesive may absorb some of the secondary impact forces by slowing or preventing the release of the pedestrian from the external airbag upon the pedestrian rebounding from the initial impact. For instance, as shown in FIG. 3, the external airbag 202 may be coated with an adhesive 301, such as a fast-tack adhesive, at an impact area of the external airbag (or where a pedestrian or other object is likely to impact the airbag). A fast-tack adhesive 301 may be any adhesive which quickly bonds with an object, such as pedestrian 203 which makes contact with the adhesive. In some embodiments more than one adhesive having differing levels of tack may be applied to the external airbag.

Figure 4B:
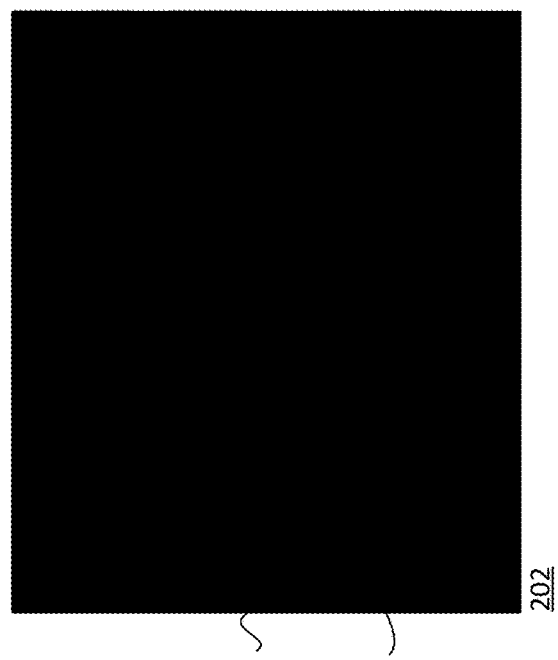
FIGS. 4A and 4B are example illustrations of an external airbag coated with an adhesive in accordance with aspects of the disclosure.
Figure 4A:
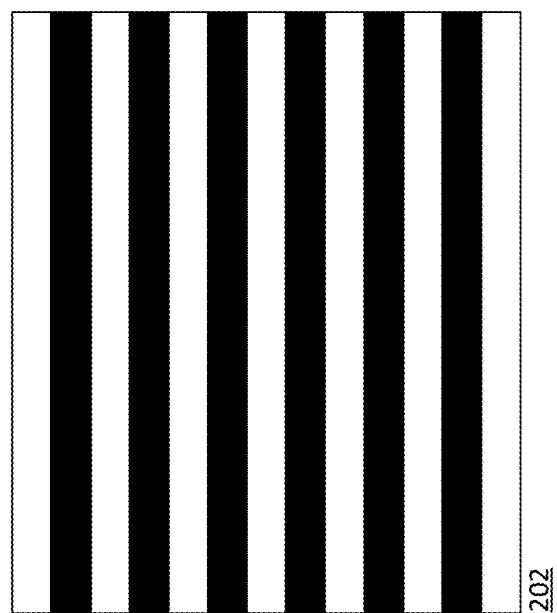

The adhesive may be applied in a pattern and/or covered to avoid the external airbag sticking to itself during deployment. For instance, the adhesive may be applied to the external airbag 202 in a pattern, as shown in FIG. 4A. In this regard, the adhesive on the external airbag may be applied to the airbag in a striped pattern 403, such that when the external airbag is folded, such as in an accordion fold within the vehicle, the adhesive only makes contact with portions of the impact area of the airbag which are not covered with adhesive 401. As such, the force necessary to expand the airbag will be about half the amount as needed to expand an airbag where the impact area is entirely covered in adhesive. Other patterns of adhesive application may also be used, such as vertical or diagonal stripes, blocks or blotches of adhesive, etc. In some embodiments portions of the external airbag which are not covered with adhesive 401 may be coated with a release agent or a non-stick material to reduce the force necessary to expand the airbag In another embodiment, the entire impact area of the external airbag may be coated by the adhesive, as shown in FIG. 4B. In this regard, the entire impact area 405 of the external airbag 202, which is positioned to make contact with an object, may be coated with the adhesive 301. Additionally, particular areas, or the entirety of the entire back portion (opposite of the impact area) may optionally be coated with the adhesive. To prevent the external airbag sticking to itself during deployment, the force necessary to expand the external airbag may be increased to force the external airbag to unstick and fully expand.

Figure 4C:
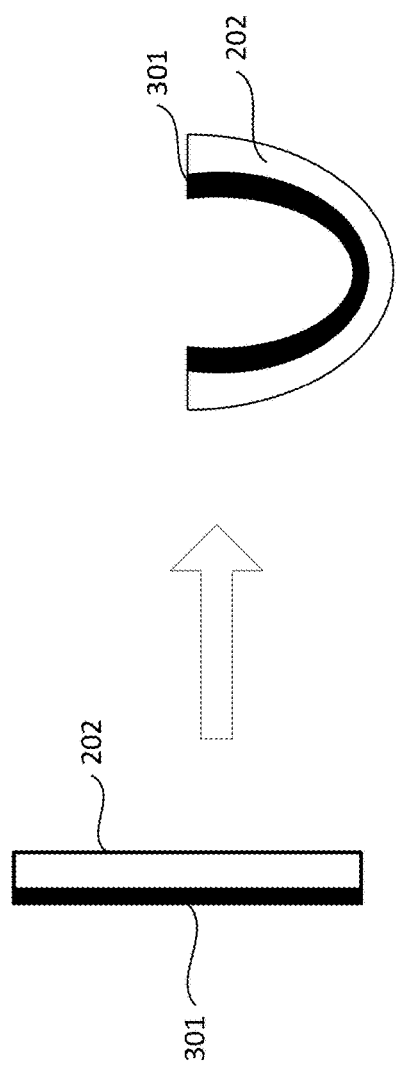
FIGS. 4C and 4D are example illustrations of an external airbag coated with an adhesive folded in accordance with aspects of the disclosure.
Figure 4D:
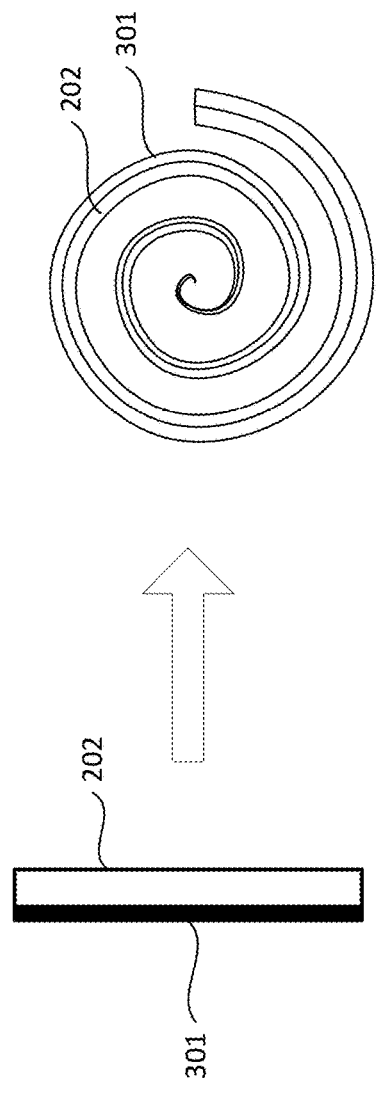

The external airbag may be folded and stored within a compartment. For example, as illustrated in FIG. 4C the external airbag 202 may be folded in on itself from an expanded state such that the adhesive 301 is positioned within the external airbag 202. The folded external airbag may be then stored within a compartment, such as compartment 204. During deployment the external airbag may be ejected from the compartment inverted back to the expanded state, as discussed further herein. In another example, the external airbag may be rolled upon itself, as shown in FIG. 4D. Although only one side of the external airbag 202 is shown to be coated in adhesive the entire external airbag 202 may be coated in adhesive. To prevent the external airbag sticking to itself during deployment, the force necessary to expand the external airbag may be increased to force the external airbag to unstick and fully expand.

Figure 5:
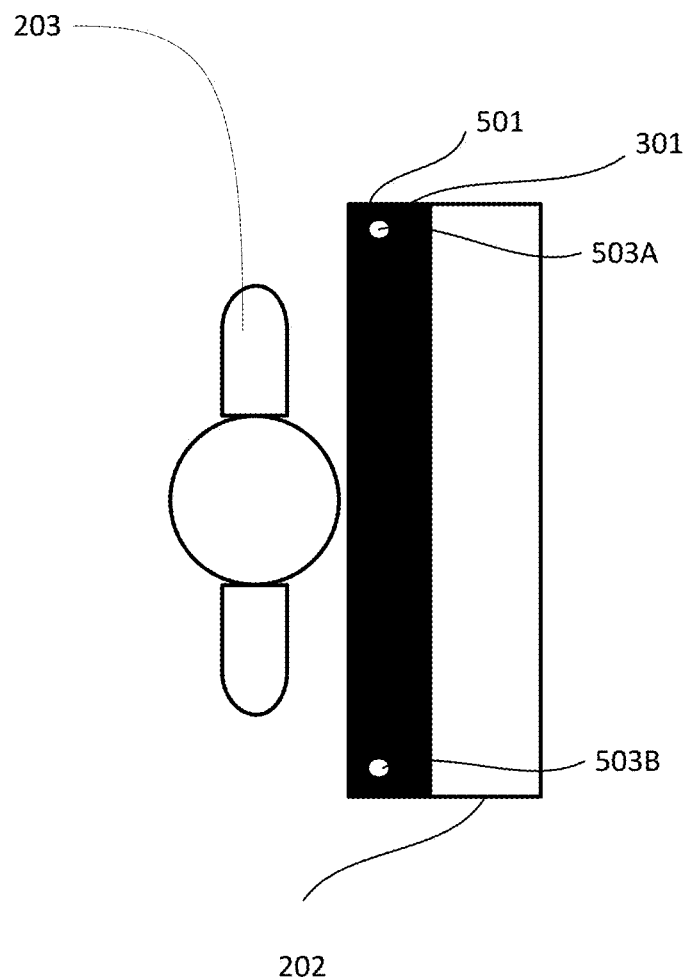
FIG. 5 is an example external view of a vehicle with an external airbag with a release layer in accordance with aspects of the disclosure.

In some embodiments, the adhesive may be covered by a release layer which may be removed from the adhesive as the airbag is expanded. For instance, as shown in FIG. 5, a release layer 501 may be applied over the adhesive 301 applied to the external airbag 202.

The release layer may be removed during deployment of the external airbag by attaching the release layer to a static structure attached to the vehicle. For example, connection points 503A and 503B, of the release layer 501, may be attached to a static structure of the vehicle, such as the vehicle's body or a location within compartment 204. As the external airbag 202 unfolds during deployment, the connection points 503A and 503B may remain attached to the vehicle's body. As such, a pulling force may be applied to the release layer 501 which may cause the release layer 501 to be pulled away from the adhesive 301.

Figure 6:
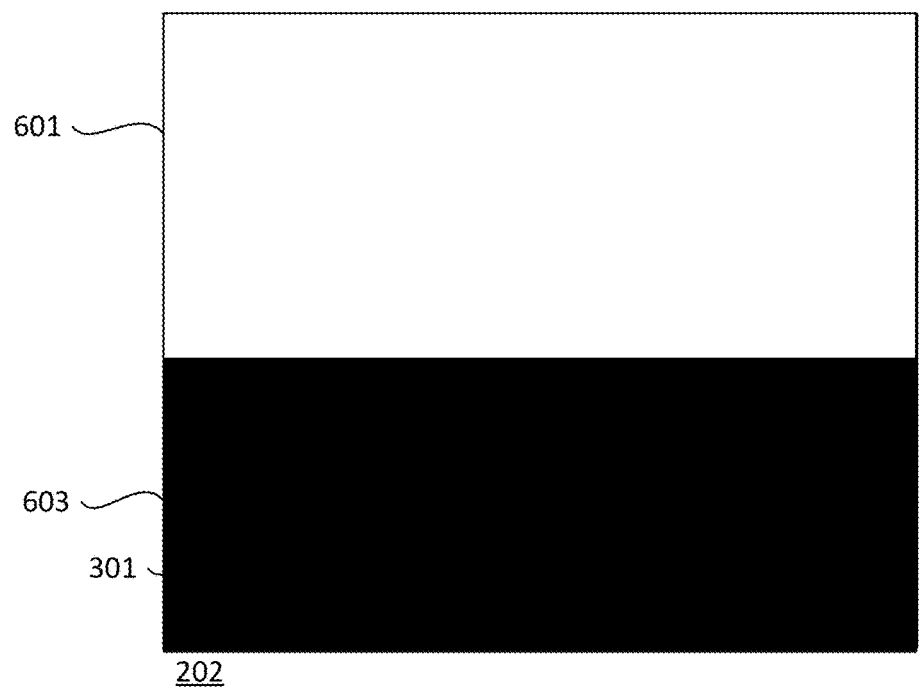
FIG. 6 is example view of an external airbag partially coated with an adhesive in accordance with aspects of the disclosure.

Only particular areas of the external airbag may be covered in adhesive to target certain portions of a pedestrian's body. For example, as shown in FIG. 6, the lower portion 603 of the impact area of the external airbag relative to the ground may be covered with adhesive 301 and the top portion 601 of the impact area of the external airbag may have no layer of adhesive. When a pedestrian impact the external airbag, the pedestrian's legs may stick to the lower portion 603 of the external airbag 202, and the pedestrian's upper body may remain free. As such, during and after impact with the external airbag, the rotational velocity of the pedestrian's head and other body parts may be reduced.

Figure 7:
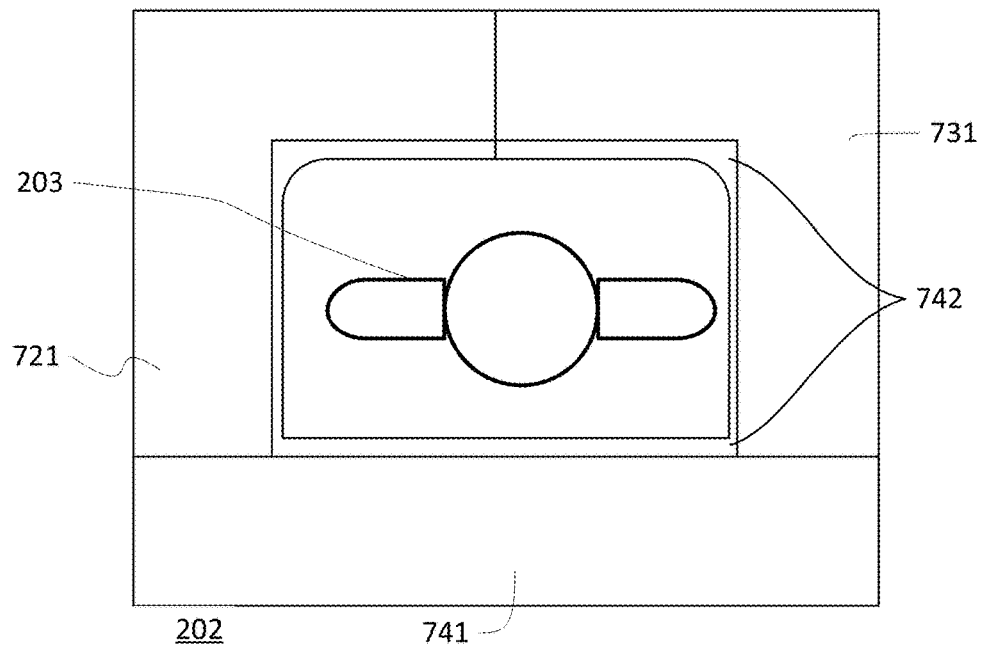
FIG. 7 is an illustration of a pedestrian being surrounded by an external airbag in accordance with aspects of the disclosure.

In some embodiments the airbag may enclose the pedestrian and be detachable from the vehicle. In this regard, the external airbag may be designed to entirely or at least partially surround the pedestrian and release from the vehicle when the pedestrian rebounds from the initial impact. For instance, as shown in FIG. 7, the external airbag 202 may include one or more arms 721 and 731. Upon the pedestrian's initial impact with the external airbag 202, the force of the impact may cause air within the external airbag to shift via a pressure differential, or a similar mechanism, from an initial impact section 741 to the one or more arms 721 and 731, causing the one or more arms 221 and 223 to stiffen. As such, the one or more arms 721 and 731 may encase the pedestrian 203 during initial impact and absorb some of the secondary impact forces felt by the pedestrian 203 as the pedestrian rebounds from the initial impact section 741.

Further, the interior portion of the airbag which surrounds the pedestrian may be coated with an adhesive. For instance, as further shown in FIG. 7, the interior portion 42 of the airbag (corresponding to an impact area) which surround the pedestrian may be coated with the adhesive. The adhesive in the interior portion 742 of the external airbag 202 may reduce the initial and secondary impact forces felt by the pedestrian 203.

Figure 8:
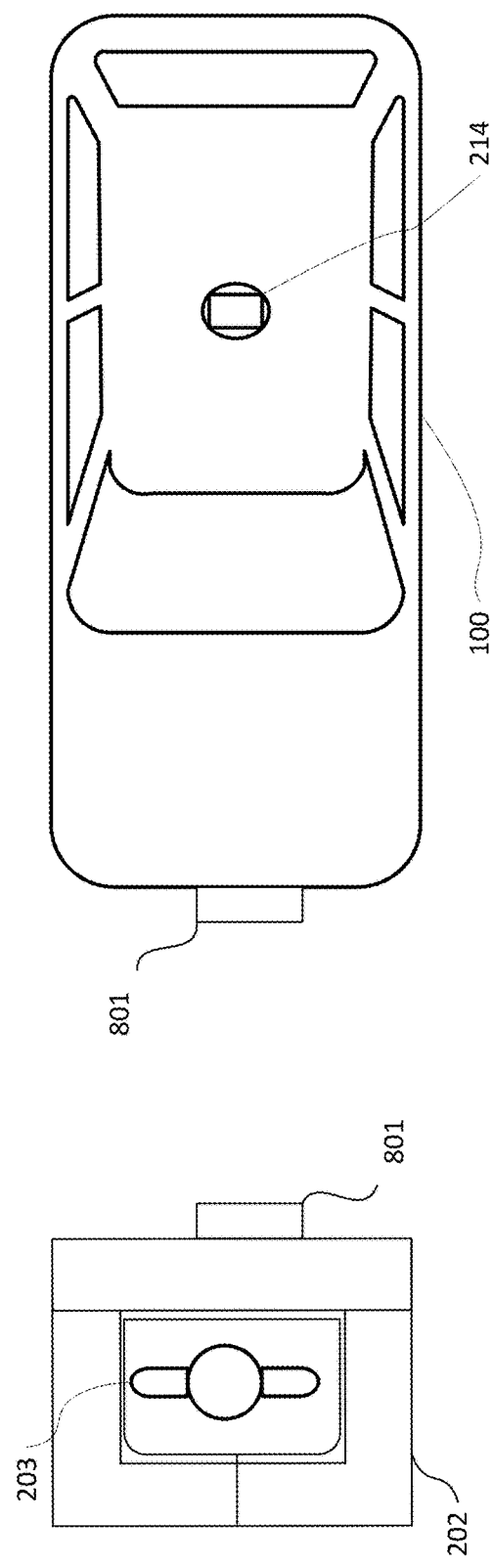
FIG. 8 is an example view of an external airbag separating from a vehicle in accordance with aspects of the disclosure.

As shown in FIG. 8, the external airbag 202 may be attached to the vehicle with a fastener, such as a temporary adhesive or connector 801. Such a fastener may be glue or a hook and loop fastener. Upon the pedestrian 203 rebounding from the initial impact, the connector 801 may release the external airbag 202 causing the external airbag 202, and the pedestrian 203 therein, to move freely from the vehicle. As such, in addition to the initial impact forces felt by the pedestrian, the external airbag 202 may absorb some of the secondary impact forces felt by the pedestrian 203. The impact forces felt by the pedestrian may be further reduced by including adhesive as discussed above.

Figure 9A:
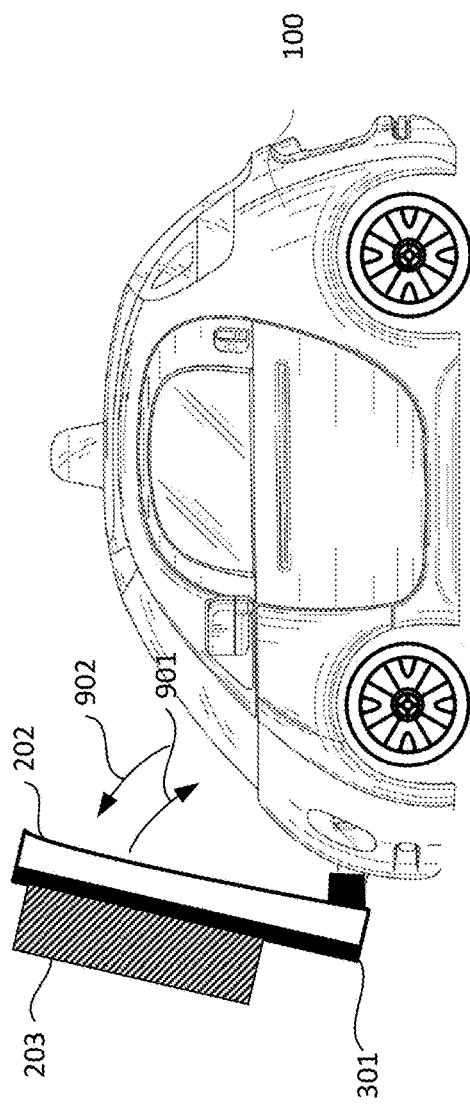
FIGS. 9A and 9B are illustrations of a pedestrian attached to an external airbag in accordance with aspects of the disclosure.

As shown in FIG. 9A, back portion of the external airbag 202 may not be coated with an adhesive. As such, when an initial impact with an object, such as a pedestrian, is made with the front portion of the external airbag, the adhesive 301 may quickly bond with the pedestrian 203. The force of the impact with the pedestrian 203 may cause the external airbag 202 to move in a first direction 901 and collapse into the vehicle 100 causing an initial impact. After the initial impact, the pedestrian and external airbag rebound away from the vehicle 100 in a second direction 902. In this regard, the external airbag may rebound away from the vehicle 100 with the pedestrian 203 secured to the external airbag.

Figure 9B:
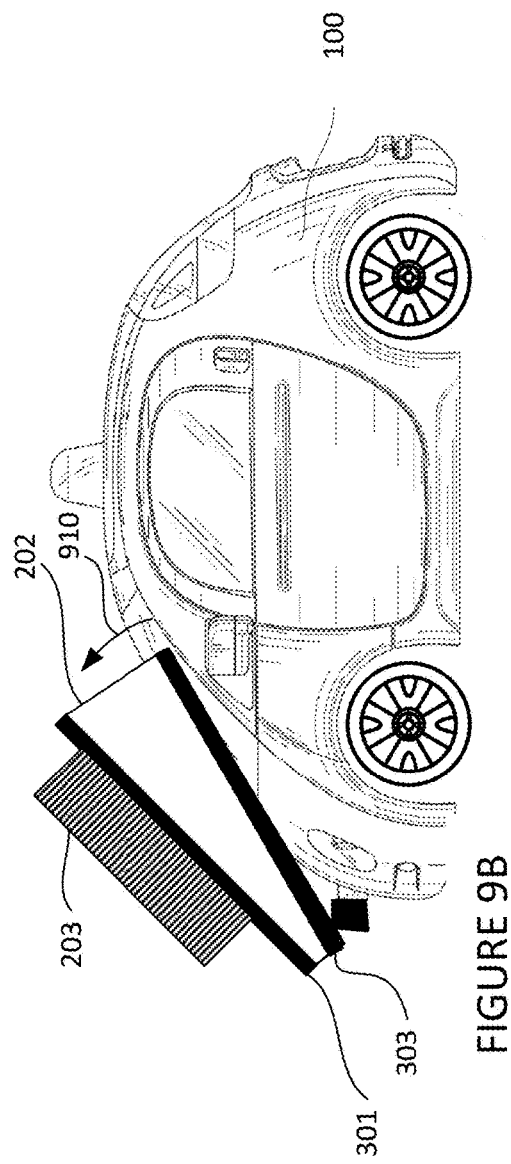

In some embodiments adhesive on the back portion (opposite of the impact area) of the external airbag may bond with the body of the vehicle. As such, the external airbag may absorb the rebound force of the pedestrian while maintaining a bond with both the pedestrian and the vehicle, in contrast to just the pedestrian, as shown in FIG. 9A. In this regard, in the event the back portion of the external airbag is coated with an adhesive, 303, as shown in FIG. 9B, the external airbag may not rebound away from the vehicle. For example, the adhesive 303 on the back portion of the external airbag 202 may bond to a surface of the vehicle (such as a hood portion) upon the initial impact. As such, the external airbag may absorb rebounding forces introduced by the airbag and pedestrian attempting to rebound from the initial impact, such as in direction 910, causing the external airbag 202 to stretch apart, but remain attached to the vehicle 100.

Although FIGS. 9A and 9B show the external airbag at the front of the vehicle 100, as noted above, external airbags may be positioned anywhere on the vehicle.

The external airbag may also be folded and stored in an everted configuration. For example, as illustrated in FIG. 10A the external airbag 202 may be everted and in an accordion fold. In this regard, the adhesive 301 may be positioned within the external airbag and the folded external airbag may be attached to a vehicle or compartment at attachment point 1001.

During deployment the external airbag may be ejected from the compartment inverted back to the expanded state. For instance as shown in FIG. 10B, the external airbag 202 may be expanded such that the airbag begins to unfold. As the external airbag is ejected from the compartment, the everted portions of the external airbag, such as the adhesive layer 301 may wrap over the attachment point 1001 and become exposed, as shown in FIG. 10C. As shown in FIG. 10D, the external airbag may be fully inverted back to the expanded state, such that the adhesive is positioned at an impact area of the external airbag (or where a pedestrian or other object is likely to impact the airbag).

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Prior to deploying the safety mechanisms, vehicle's computing devices may use information from the vehicle's sensors to identify and track objects in the vehicle's environment. For example, one or more computing devices of the perception system 172 may use information form the vehicle's sensors to detect and identify the characteristics (size, speed, shape, direction, object type, etc.) of various objects in the vehicle's environment. FIG. 9 is an example 1100 bird's eye view of vehicle 100 as it drives along roadway 1130 in the direction of arrow 1102. In this example, the one or more computing devices of the perception system 172 may identify, among other things, the location and objects in the vehicle's environment, such as object 1110. After a brief period of tracking the object, the perception system 172 may determine the speeds and headings of the object as shown by arrows 1112.

Figure 11:
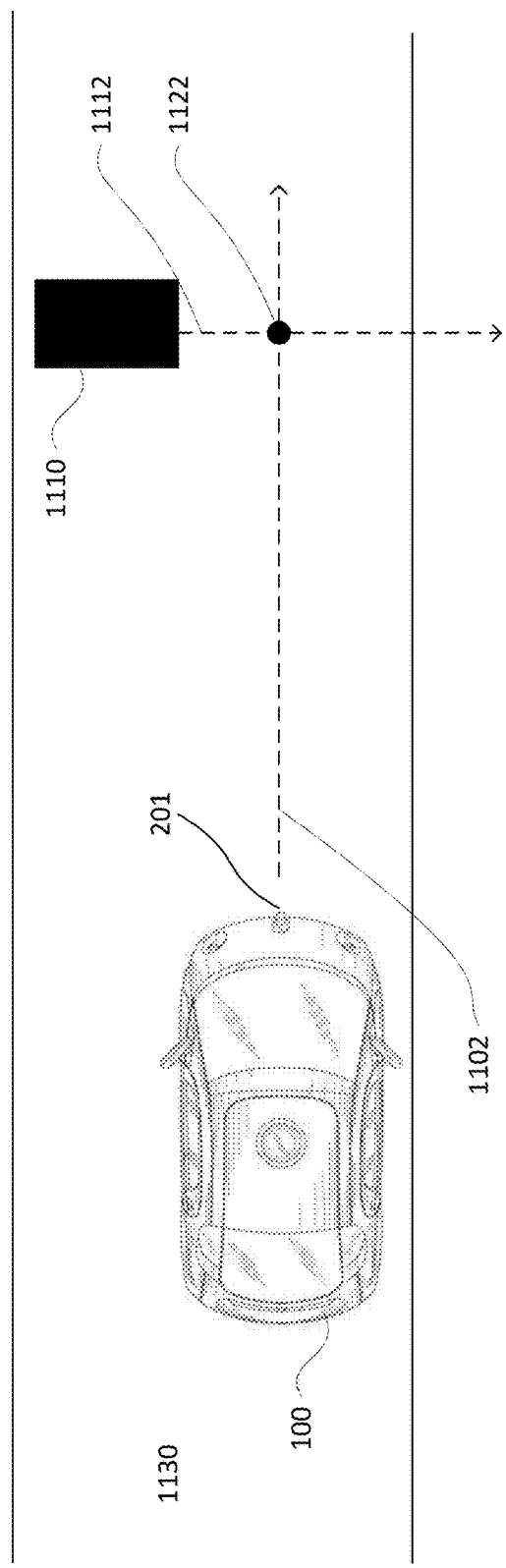
FIG. 11 is an example situational diagram in accordance with aspects of the disclosure.

In addition, the vehicle's computing devices may use the characteristics of the object 1110, such as speed and heading, to predict future locations where the object 1110 will be. For example, as shown in example 1100 of FIG. 11, direction arrow 1102 represents predicted future locations of vehicle 100 and arrow 1112 represents the predicted future locations of object 1110. Because the predicted future locations of these objects is just that, a prediction, predictions may quickly become less accurate the farther into the future they become.

The vehicle's computing devices may also determine whether the future locations indicate that the vehicle will collide with the object. For example, the perception system or computing device 110 may determine that an impact with object 1110 is likely to occur at the locations of predicted impact point 1122. This impact point may be defined as a three-dimensional coordinate (x, Y, Z) in space such as latitude, longitude, and altitude or similar.

In most cases, if a collision is likely, the vehicle's computing devices may maneuver the vehicle in order to avoid the object. For example, computing device 110 may use the steering, acceleration and deceleration systems to maneuver vehicle 100 out of the path of object 1110.

However if there is not enough time to avoid the object, (i.e. not enough distance, not enough braking power, not enough room to go around or avoid etc.) the vehicle's computing devices may determine that an impact with the object is imminent. For example, an impact may be imminent, when an impact is predicted to occur within a predetermined period of time, such as a few seconds or more or less. When an impact is imminent, the vehicle's protection system 174 may send a signal to deploy the external airbag This triggering signal may be sent for example by computing device 110, laser sensor 214, or the one or more computing devices of protection system 174. This signal may cause an external airbag on the vehicle to deploy. For example, as shown in FIG. 8, the front of the vehicle 100 may be predicted to impact object 1110 at point 1122. As such, the computing device 110 may send a triggering signal to deploy airbag 202 prior to the impact.

Figure 12:
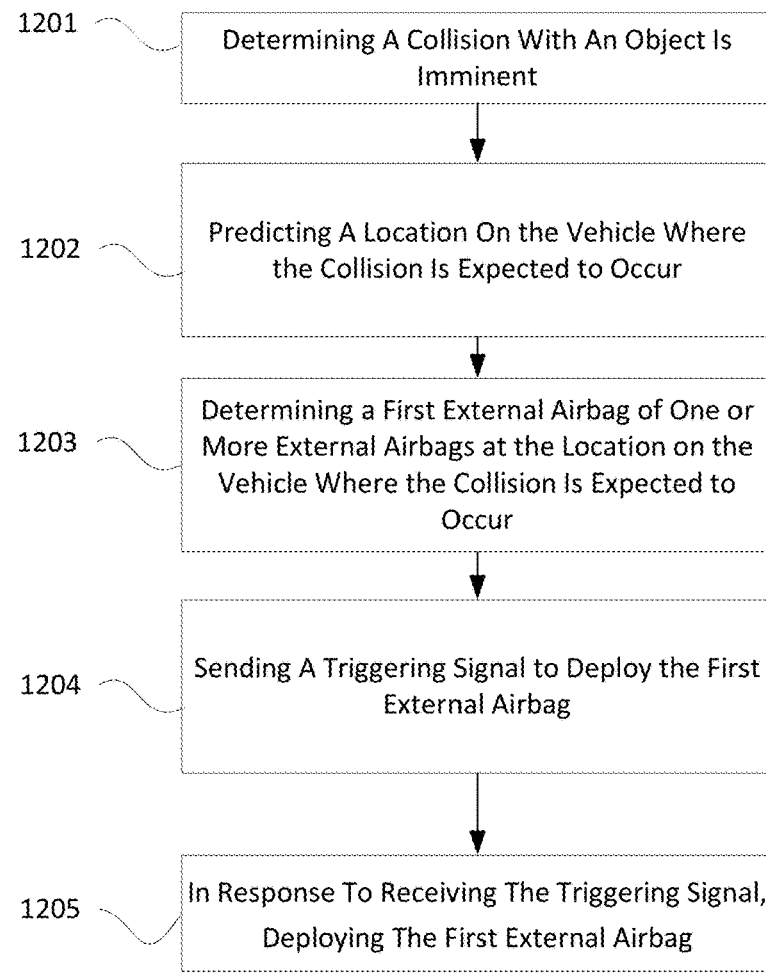
FIG. 12 is an example flow diagram in accordance with aspects of the disclosure.

FIG. 12 is an example flow diagram 1200 including a method for reducing likelihood of injury or damage to an object in a collision with a vehicle, in accordance with some of the aspects described above. For example, at block 1201, a determination that a collision with an object is imminent. At block 1202 the location on the vehicle where the collision with the object is expected to occur may be detected and a determination of a first external airbag of one or more external airbags at the location on the vehicle where the collision is expected to occur may be made, as shown in block 1203. A triggering signal may be sent to deploy the first external airbag as shown at block 1204 and in response to receiving the triggering signal, the first external airbag may be deployed, as shown in block 1205. In some embodiments more than one external airbag may be deployed.

Although the examples described herein are related to the use of vehicles when operating in autonomous driving modes, such features may also be useful for vehicles operating in manual or semi-autonomous modes or for vehicles having only manual driving mode and/or semi-autonomous driving modes. In such cases, an active safety mechanism may be identified as discussed above. However, when making the determination as to whether to deploy the active safety mechanism and/or control the vehicle as discussed above, the reaction time of the driver may be compared with the estimated time at which an impact with an object is expected to occur. Reaction times may be determined, for example, by monitoring a specific driver's reaction times over time or by using average or expected reaction times for drivers in general. If the reaction time is too slow, the vehicle's computing device may then use the estimated time when an update will be received to determine whether to deploy the active safety mechanism and, in the case of a vehicle with such capabilities to take control and maneuver the vehicle as discussed in the examples above.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
   an external airbag configured to deploy in a vehicle's external environment in order to reduce the likelihood of an object colliding directly with the vehicle; and
   at least one adhesive layer arranged on the external airbag, wherein the adhesive layer is configured to reduce injury caused by a secondary impact of an object after an initial impact of the object with the external airbag by causing the object to stick to the external airbag, wherein the adhesive is covered by a removable release layer and the removable release layer is configured to be removed from the adhesive upon deployment of the external airbag.

2. The system of claim 1, wherein the external airbag comprises a front portion where an impact with the object is expected to occur and an opposite back portion, and wherein the adhesive layer is applied to the front portion.

3. The system of claim 2, further comprising a second adhesive layer applied to the opposite back portion, wherein the second adhesive layer is configured to bond the external airbag to the vehicle.

4. The system of claim 1, wherein the adhesive is applied in a patterned arrangement.

5. The system of claim 1, wherein the object is a pedestrian and the adhesive is applied on a lower portion corresponding to an expected location of the legs of the object prior to impact.

6. The system of claim 1, wherein the removable release layer is attached to the vehicle and is configured to be removed from the adhesive by the vehicle pulling the release layer upon deployment of the external airbag.

7. The system of claim 1, wherein the adhesive comprises a fast-tack glue.

8. The system of claim 1, wherein the external airbag is attached to the vehicle with a fastener and the fastener releases the external airbag from the vehicle after the initial impact.

9. The system of claim 1 further comprising an expansion device, wherein the expansion device is configured to deploy the external airbag with an expansion force greater than the force of the adhesive.

10. The system of claim 1 further comprising at least one non-stick layer arranged on the external airbag at locations where the at least one adhesive layer is not present.

11. The system of claim 1, wherein the external airbag is stored in a compartment attached to the vehicle.

12. The system of claim 11, wherein the external airbag is rolled upon itself while stored in the compartment.

13. The system of claim 11, wherein the external airbag is everted while stored in the compartment.

14. The system of claim 11, wherein the external airbag is accordion folded.

15. The system of claim 11, wherein the external airbag is configured to be deployed by inflation, wherein the inflation causes the external airbag to expand.

16. The system of claim 1 further comprising:
    a vehicle and an external airbag system, wherein the external airbag system comprises the external airbag and the external airbag system is attached to the vehicle.

17. A method for deploying a vehicle's external airbag configured to deploy in a vehicle's external environment in order to reduce the likelihood of an object colliding directly with the vehicle comprising:
    determining, by one or more processors, a collision with the object is imminent;
    predicting, by the one or more processors, the location on the vehicle where the collision with the object is expected to occur;
    determining a first external airbag of one or more external airbags at the location on the vehicle where the collision is expected to occur;
    sending, by the one or more processors, a triggering signal to deploy the first external airbag; and
    in response to receiving the triggering signal, deploying by one or more processors, the first external airbag, wherein the first external airbag comprises at least one adhesive layer arranged on the first external airbag, wherein the adhesive layer is configured to reduce injury caused by a secondary impact of an object after an initial impact of the object with the external airbag by causing the object to stick to the external airbag, and wherein the adhesive is covered by a removable release layer prior to deployment and the removable release layer is configured to be removed from the adhesive upon deployment of the external airbag.

18. The method of claim 17, wherein the external airbag comprises a front portion where an impact with the object is expected to occur and an opposite back portion, and wherein the adhesive layer is applied to the entire front portion.

* * * * *